2,873,287

PROCESS FOR PREPARING VINYLTIN COMPOUNDS

Hugh E. Ramsden, Scotch Plains, N. J., assignor to Metal & Thermit Corporation, New York, N. Y., a corporation of New Jersey No Drawing. Application May 9, 1956
Serial No. 583,612

9 Claims. (Cl. 260—429.7)

The present invention relates to a process for making vinylictin compounds.

It has now been discovered that vinylictin compounds can be prepared by a novel efficient and economical chemical process.

It is an object of the present invention to provide a process for the production of vinylictin compounds.

Another object of the invention is to provide a process for producing organotin compounds containing at least one vinylic radical bonded to the tin.

Generally speaking, the present invention contemplates a process for producting vinylictin compounds having the general formula:

(1) $\quad Vi_nR_aR'_bR''_cSnX_{4-(n+a+b+c)}$ wherein $n=1, 2, 3$ or $4$; $a$, $b$ and $c=0$ or $1$; $a+b+c+n$ may not total more than 4; Vi is a vinylic radical; R, R', R'' may be the same or different and are selected from the group consisting of alkyl, cycloalkyl, polymethylene, alkenyl, cycloalkenyl, alkynyl, alkadienyl, cycloalkadienyl, aryl, aralkyl, and active-hydrogen-free heterocyclic radicals; and X is a halogen selected from the group consisting of iodine, bromine, chlorine and fluorine. Two or more R groups may be cyclized. The aryl radicals include fused ring and condensed radicals. The term "vinylic radical" (Vi) is used herein to denote structures of the type:

(2) 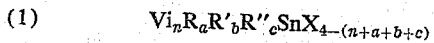

where the No. 1 carbon is bonded to tin. R''' and R'''' may be hydrogen and are further defined as in R above. The hydrocarbon radicals may be unsubstituted or may carry functional groups inert to magnesium or vinylic magnesium chlorides under the process conditions. Z is defined as is R above and may also be hydrogen, chlorine, or fluorine. The vinylic radical also includes cycloalkenyls having the following general type structure:

(3) 

where $l$ is a whole number greater than 1. By the term "active-hydrogen-free heterocyclic radical," all heterocyclic radicals, except those containing hydrogen attached to nitrogen or oxygen, or containing other groups reactive with the organic magnesium chlorides, are included.

The present process for producing vinylictin compounds comprises reacting a vinylicmagnesium chloride with an organotin halide or a stannic halide to produce vinyl-containing tin compounds in accordance with the following equation:

(4) 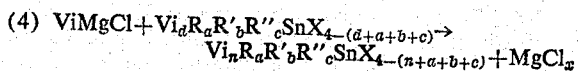

wherein $n=1, 2, 3,$ or $4$; $d=0, 2,$ or $3$; $a, b$ and $c=0$ or $1$; $d+a+b+c$ may not be greater than 3. Vi has the same significance ascribed to it above; and R, R' and R'' are the same or different and have the same meaning given to them above. The following type compounds are the products included within the general formula for the vinylictin product above: ViRR'R''Sn, ViRR'SnX, ViRSnX$_2$, ViSnX$_3$, Vi$_2$RR'Sn, Vi$_2$RSnX, Vi$_2$SnX$_2$, Vi$_3$RSn, Vi$_3$SnX, Vi$_4$Sn. As illustrated in the foregoing equation (4), the organotin halide reactant may contain a vinylic radical bonded to the tin atom. If so, said reactant was also made in accordance with the present process.

An aspect of the present invention is illustrated in the following equation:

(5) 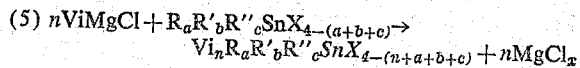

wherein $n=1, 2, 3,$ or $4$; $a$, $b$, and $c=0$ or $1$; the sum of $n+a+b+c$ being not greater than 4; the sum of $a+b+c$ may not be greater than 3; Vi has the same significance ascribed to it above; and R, R' and R'' are the same or different and have the same meaning given to the above. The process may be so controlled that any of the aforementioned products or a mixture of products may be produced. It is also possible to carry out the reaction step-wise by first reacting a vinylicmagnesium chloride with an organotin halide not containing vinylic radicals or with stannic halide, and then further reacting the product of this reaction with a vinylicmagnesium chloride as illustrated in equation (4) herein.

Vinylictin compounds may also be prepared by reacting a vinylictin halide containing at least one vinylic group bonded to the tin atom with an organomagnesium halide (preferably the chloride). Thus, diphenylvinyltin chloride may be produced by reacting vinyltin trichloride with phenylmagnesium chloride. Of course, the vinyltin halide utilized as the reactant is produced by the process of this invention, as illustrated in equation (4). The use of this two-step procedure is advantageous in certain cases where it will result in mixtures of reaction products and reactants which are more easily separated than would be mixtures resulting from the one step process illustrated in equation (4) (were it used to prepare the same product directly).

When the vinylicmagnesium chloride is reacted with the halogen-containing tin compound, the product may be any of the type compounds listed hereinbefore (as products) or any mixture of them, dependent upon the reactants used, the relative proportions of the reactants used, and the process conditions. The reaction product will usually be a mixture of 2 or 3 of the above products. However, by control of the variables, it is possible to produce a product containing a preponderance of a desired reaction product. A single product is obtained when using a monohalogen tin compound as the tin containing reactant or a sufficient excess of ViMgCl with SnX$_4$, RSnX$_3$, R$_2$SnX$_2$ to give Vi$_4$Sn, Vi$_3$RSn, Vi$_2$SnR$_2$.

The process is usually carried out by dissolving the tin-containing reactant in an organic solvent. In certain cases, this need not be done, e. g., vinyltin trichloride can be prepared by adding vinylmagnesium chloride to an excess of tin tetrachloride. Vinylmagnesium chloride is then added to the solution, preferably with agitation. A reaction will usually start immediately. If all of the halogen is to be replaced, the organotin halide or stannic halide may be added to the vinylicmagnesium chloride solution. The reaction temperature will vary with the reactants and solvents utilized and the products desired, and will usually be between room temperature and the reflux temperature of the reaction mixture. The reaction is usually exothermic. For special conditions, it may be necessary to carry the reaction out at low temperatures or under reduced pressures. The reaction is preferably carried out in an inert atmosphere usually nitrogen which is the least expensive. The reaction products include one or more of the vinylictin compounds and a magnesium halide salt cake which may be separated by conventional means, e. g., filtration, drowning in and extraction by acidified water, crystallization, etc. The solvents are usually removed by distillation. When the products include more than one vinylictin compound, they may be separated by conventional separatory techniques.

The vinylicmagnesium chlorides are prepared as disclosed in U. S. Patent Application No. 549,517, now abandoned.

The solvent utilized must be inert to the other components of the reaction mixture under the process conditions and is preferably an organic solvent that distills below 150° C. The preferred solvents include substituted and unsubstituted tetrahydrofuran, tetrahydropyran, heptane, hexane, pentane, octane, isooctane, cumene, xylene, etc. Although tetrahydrofuran and tetrahydropyran are generally preferred solvents, they may not be used in major portions in specific reactions as certain tin tetrahalides and organotin trihalides form complexes with the cyclic methylene oxides. A solvent system containing more than one component may also be used. A preferred solvent system is that containing tetrahydrofuran and a hydrocarbon solvent. Almost all the reaction mixtures utilized will contain tetrahydrofuran or equivalent material designated as compound Q, hereinafter defined, complexed with the Grignard.

Compound Q is a substituted or unsubstituted heterocyclic compound (having 5 or 6 atoms in the ring) containing one oxygen atom in the ring structure; the other ring atoms being carbon, with the exception that one nitrogen atom may be substituted for any carbon atom other than those carbon atoms adjacent to the oxygen. The heterocyclic compounds may contain a single unsaturated bond, as in dihydropyran. Compounds within this definition include tetrahydrofuran, tetrahydropyran, 2-methyltetrahydrofuran, 2-ethoxytetrahydropyran, tetrahydrofurfuryl ethyl ether, dihydropyran and N-methylmorpholine. Permissible substitutions are groups which are not reactive with organomagnesium chlorides, or with any of the other components and products of the reaction mixtures of the present process and include substituted and unsubstituted alkyl, aryl, alkoxy and aryloxy groups (all allowable substitutes being those unreactive to other components of the reaction mixture as specified herein). When nitrogen replaces a carbon atom, hydrogen on the nitrogen atom must be substituted with a group unreactive to the reactants or reaction products. A further requirement for Q is that the oxygen must be available for electron donation, i. e., the free p-electrons present on the oxygen, should be available for coordination with the organomagnesium chloride. Any blocking groups in the 2- and 5(6) positions, may restrict the availability of these electrons. Another way these electrons may be restricted in their availability is by the p-pi resonance, as for example in furan, which is not operative. One double bond giving p-pi resonance, as in dihydropyran (which is operative) allows reactivity since the oxygen still has free p-electrons. Expressed in another fashion, the oxygen of the heterocyclic ring structure must be such that electrons of the oxygen atom are available for coordination and complex formation with magnesium.

The compound Q may be a simple 5 or 6 member heterocyclic ring compound containing one oxygen atom having the requisite characteristics set forth above, e. g., tetrahydrofuran, tetrahydropyran, dihydropyran, etc. It may also be a 5 or 6 member heterocyclic compound containing one oxygen in the ring and further substituted by monovalent groups and having said characteristics, e. g., 2-methyltetrahydrofuran, 2-exthoxytetrahydrofuran, tetrahydrofurfuryl ethyl ether, N-methylmorpholine, etc.

The following examples are further illustrative of the present invention. It is to be understood however, that this invention is not restricted thereto.

*Example 1.—Triphenylvinyltin*

To 163 g. (0.421 mole) of triphenyltin chloride in 500 ml. of benzene is added 0.505 mole of vinylmagnesium chloride in 360 ml. of tetrahydrofuran. The mixture is stirred until the reaction is completed and is then hydrolyzed by the cautious addition of 1 liter of water. The organic layer is separated and the solvents are removed by distillation. The residual oil is crystallized from ethanol to yield 133 g. (84%) of triphenylvinyltin.

*Example 2.—Triethylvinyltin*

To 242 g. (1.0 mole) of triethyltin chloride in 1 liter of heptane is added 1.2 moles of vinylmagnesium chloride in 600 ml. of tetrahydrofuran. The mixture is stirred until the reaction is completed and is then hydrolyzed by the cautious addition of 1 liter of water. The organic layer is separated and the solvents are removed by distillation. The residue is distilled at 1 atm. to yield 165 g. (72%) of triethylvinyltin.

*Example 3.—Tributylvinyltin*

Substituting 1.0 mole of tributyltin chloride for the triethyltin chloride in Example 2, yields tributylvinyltin.

*Example 4.—Diphenylbutylvinyltin*

To 1.0 mole of butylvinyltin dibromide in 1 liter of heptane is added 2.0 moles of phenylmagnesium chloride in tetrahydropyran solution. The mixture is stirred until the reaction is completed, the reaction mixture hydrolyzed, the organic layer separated and distilled to yield diphenylbutylvinyltin.

*Example 5.—Tricyclopentadienylvinyltin*

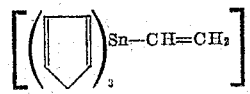

To 3.0 moles of tricyclopentadienyltin monochloride is added 1.0 mole of vinylmagnesium chloride in 2-methyltetrahydrofuran. Upon completion of the reaction, the mixture is hydrolyzed, the organic layer separated and distilled to yield tricyclopentadienylvinyltin.

*Example 6.—Dibutylvinyltin chloride*

To 1.0 mole of vinyltin trichloride in 1.0 l. of heptane is added 2.0 mole of butylmagnesium chloride in tetrahydrofuran solution. The mixture is stirred until the reaction is completed and is then hydrolyzed by the cautious addition in the cold of 1.0 l. of a 15% hydrochloric acid solution. The organic layer is separated and the solvents are removed by distillation. The residue is carefully fractionally distilled under reduced pressure to yield dibutylvinyltin chloride.

*Example 7.—Diphenylvinyltin chloride*

By substituting 2.0 mole of phenylmagnesium chloride for the butylmagnesium chloride in the procedure of Example 6 diphenylvinyltin chloride is prepared.

*Example 8.—Cyclopentamethylenevinyltin chloride*

To 1.0 mole of cyclopentamethylenetin dichloride in 1.0 l. of heptane is added 1.0 mole of vinylmagnesium chloride in tetrahydrofuran. The mixture is stirred until the reaction is completed and then hydrolyzed. The organic layer is separated and then distilled to yield cyclopentamethylenevinyltin chloride.

*Example 9.—Cyclopentylvinyltin dichloride*

To 1.0 mole of cyclopentyltin trichloride in octane is added 1.0 mole of vinylmagnesium chloride in 2-ethoxy tetrahydropyran. The mixture is stirred until the reaction is completed. The reaction mixture is then hydrolyzed, the organic layer separated and distilled to yield cyclopentylvinyltin dichloride.

Example 10.—Butylvinyltin dichloride

To 1.0 mole of vinyltin trichloride in 1.0 l. of heptane is added 1.0 mole of butylmagnesium chloride in tetrahydrofuran solution. The mixture is stirred until the reaction is completed and is then hydrolyzed by the cautious addition in the cold of 0.5 l. of a 15% hydrochloric acid solution. The organic layer is separated and the solvents are removed by distillation. The residue is carefully fractionally distilled under reduced pressure to yield butylvinyltin dichloride.

Example 11.—Phenylvinyltin dichloride

By substituting 1.0 mole of phenylmagnesium chloride for the butylmagnesium chloride in the procedure of Example 10, phenylvinyltin dichloride is prepared.

Example 12.—Thienylvinyltin dichloride

To 1.0 mole of vinyltin trichloride in 1 liter of heptane is added 1.0 mole of thienylmagnesium chloride in tetrahydrofurfuryl ethyl ether. The mixture is stirred until the reaction is completed. The reaction mixture is hydrolyzed, the organic layer is separated and the solvents are removed by distillation. The residue is carefully distilled to yield thienylvinyltin dichloride.

Example 13.—5-methylthienylvinyltin dichloride

By substituting 1.0 mole of 5-methylthienylmagnesium chloride for the thienylmagnesium chloride in the procedure of Example 12, 5-methylthienylvinyltin dichloride is prepared.

Example 14.—Vinyltin trichloride

To 522 g. (2.0 mole) of tin tetrachloride in 1 liter of pentane is added 0.695 mole of vinylmagnesium chloride in 400 ml. of tetrahydrofuran. The mixture is stirred until the reaction is completed and then the reaction solution is filtered from the salt formed during the course of the reaction. The solution is then cautiously fractionally distilled at 1 atm. to yield pentane, tetrahydrofuran, tin tetrachloride and vinyltin trichloride. A total of 78.5 g. (49%) of vinyltin trichloride is isolated.

Example 15.—α-Fluoro-vinyltin trichloride

To 2.0 moles of tin tetrachloride in pentane is added 0.695 mole of α-fluoro-vinylmagnesium chloride in tetrahydrofuran. The reaction mixture is stirred until the reaction is completed. The reaction mixture is then hydrolyzed, the organic layer separated and distilled to yield α-fluoro-vinyltin trichloride.

Example 16.—Diphenyldivinyltin

To 196.4 g. (0.625 mole) of diphenyltin dichloride in 1 liter of heptane is added 1.34 mole of vinylmagnesium chloride in 700 ml. of tetrahydrofuran. The mixture is stirred until the reaction is completed and is then hydrolyzed by the careful addition of 1 liter of water. The organic layer is separated and the solvents are removed by distillation. The residue is carefully distilled under reduced pressure to yield 107 g. (52%) of diphenyldivinyltin.

Example 17.—Dibutyldivinyltin

To 273.5 g. (0.9 mole) of dibutyltin dichloride in 1 liter of heptane is added 2.2 moles of vinylmagnesium chloride in 600 ml. of tetrahydrofuran. The mixture is stirred until the reaction is completed and is then hydrolyzed by the careful addition of 1 liter of water. The organic layer is separated and the solvents removed by distillation. The residue is carefully distilled under reduced pressure to yield 250 g. (77%) of dibutyldivinyltin.

Example 18.—Bis-2-methyl-3-butenedivinyltin

To 1.0 mole of bis-2-methyl-3-butenetin dichloride in heptane is added 2.0 moles of vinylmagnesium chloride in dihydropyran. The mixture is stirred until the reaction is completed. The reaction mixture is hydrolyzed, the organic layer separated and distilled to yield bis-2-methyl-3-butenedivinyltin.

Example 19.—Divinylbutyltin chloride

To 1.0 mole of divinyltin dichloride in 1 liter of heptane is added 1.0 mole of butylmagnesium chloride in tetrahydrofuran solution. The mixture is stirred until the reaction is completed and is then hydrolyzed by the careful addition of 0.5 liter of 15% hydrochloric acid solution. The organic layer is separated and the solvents are removed by distillation. The residue is carefully fractionally distilled under reduced pressure to yield divinylbutyltin chloride.

Example 20.—Divinylphenyltin chloride

By substituting 1.0 mole of phenylmagnesium chloride for the butylmagnesium chloride, divinylphenyltin chloride is prepared.

Example 22.—Divinyltin dichloride

To 260.5 g. of (1.0 mole) of tin tetrachloride in 2.0 liter pentane is added 2.0 mole of vinylmagnesium chloride in 600 ml. of tetrahydrofuran. The mixture is stirred until the reaction is completed and then the reaction solution is filtered from the salt formed during the course of the reaction. The residue is fractionally distilled under reduced pressure after solvent removal, to yield 80.6 g. (35%) of divinyltin dichloride.

Example 23.—Divinyltin difluoride

To 1.0 mole of tin tetrafluoride in pentane is added 2.0 moles of vinylmagnesium chloride in N-methylmorpholine. The mixture is stirred until the reaction is completed and then the reaction solution is filtered from the salt formed from the course of the reaction. The residue is fractionally distilled under reduced pressure after solvent removal to yield divinyltin difluoride.

Example 24.—Divinyltin diiodide

To 1.0 mole of tin tetraiodide in heptane is added 2.0 moles of vinylmagnesium chloride in tetrahydrofuran. The mixture is stirred until the reaction is completed and is then hydrolyzed by the cautious addition of 1 liter of water. The organic layer is separated and the solvents are removed by distillation. The residue is crystallized from benzene and petroleum ether to yield divinyltin diiodide.

Example 25.—Bis-1-propenyltin dibromide

To 1.0 mole of tin tetrabromide in heptane is added 2.0 moles of 1-propenylmagnesium chloride in tetrahydrofuran. This mixture is stirred until the reaction is completed and is then hydrolyzed by the cautious addition of 1 liter of water. The organic layer is separated and the solvents are removed by distillation. The residue is crystallized to yield bis-1-propenyltin dibromide.

Example 26.—Trivinylphenyltin

To 1.0 mole of phenyltin trichloride in 2.0 liter of heptane is added 3.0 mole of vinylmagnesium chloride in tetrahydrofuran solution. The mixture is stirred until the reaction is completed and is then hydrolyzed by the careful addition of 1.5 liter of water. The organic layer is separated and the solvents are removed by distillation. The residue is fractionally distilled under reduced pressure to yield trivinylphenyltin.

Example 27.—Trivinyloctadecyltin

By substituting octadecyltin trichloride for the phenyltin trichloride in the procedure of Example 26, trivinyloctadecyltin is prepared.

Example 28.—Trivinyl-4-methyl-1-naphthyltin

By substituting 4-methyl-1-naphthyltin trichloride for phenyltin trichloride in the procedure of Example 26, trivinyl-4-methyl-1-naphthyltin is prepared.

Example 29.—Trivinyltin chloride

To 1.0 mole of tin tetrachloride in 3 liters of pentane is added 3.0 mole of vinylmagnesium chloride in tetrahydrofuran solution. The mixture is stirred until the reaction is completed and then the reaction solution is filtered from the salt formed during the course of the reaction. After solvent removal the residue is precisely fractionally distilled under reduced pressure to yield trivinyltin chloride.

Example 30.—Tetravinyltin

To 260.5 g. (1.0 mole) of tin tetrachloride in 2.0 liter of heptane is added 4.81 moles of vinylmagnesium chloride in 1465 ml. of tetrahydrofuran. The mixture is stirred until the reaction is completed and is then hydrolyzed by the addition of 2.0 liter of water. The organic layer is separated and the solvents are removed by distillation. The residue is fractionally distilled under reduced pressure to yield tetravinyltin.

Example 31.—Tetra-1-propenyltin

By substituting 1-propenylmagnesium chloride for the vinylmagnesium chloride in the procedure of Example 30, tetra-1-propenyltin is prepared.

The process of the present invention is an efficient and economical process for producing vinylictin compounds. These compounds are useful as stabilizers for plastic resins; as biocidal materials functioning as fungicides, slimicides, nematocides, etc.; material (wood, leather, etc.) preservatives, as additives to rubber compounds, as additives to petroleum oils; and as components of veterinary compositions effective in the control of infections of fowl and domesticated animals. In addition, these materials may be used to prepare polymers. Some are polyfunctional and are active cross-linking agents. They function as copolymers and copolymerize with such compounds as styrene, vinyl acetate, vinyl chloride, butadiene, acrylate esters, etc.

Throughout the application, the vinylic and other organomagnesium chloride compounds have been designated, for example, by the simple formula ViMgCl. When these magnesium chloride compounds are prepared in the presence of a compound Q, defined above, the vinylic or other organomagnesium chloride compounds may take the form of a complex with compound Q, for example, ViMgCl·nQ, wherein $n$ is a small indeterminate whole number. Thus, in all of the above equations ViMgCl may be replaced by ViMgCl·nQ.

This application is a continuation-in-part of Serial No. 549,571, filed November 28, 1955, which in turn was a continuation-in-part of Serial No. 520,145, filed July 5, 1955, both now abandoned.

While the invention has been described with particular reference to specific embodiments, it is to be understood that it is not limited thereto but is to be construed broadly and restricted solely by the scope of the appended claims.

What is claimed is:

1. In a process for the preparation of a vinylic tin compound which comprises reacting a vinylic magnesium chloride compound with a tin compound having a tin atom bonded to at least one halogen atom, the step which comprises carrying out the reaction in the presence of at least one mole of a cyclic ether for every mole of vinylic magnesium chloride used, said cyclic ether being selected from the class consisting of tetrahydrofurans, tetrahydropyrans, dihydropyrans, and N-methylmorpholines, with the further restriction that said cyclic ethers contain not more than one double bond in the ring and that at least one carbon atom adjacent the oxygen atom in said cyclic ether is free of any substituents other than hydrogen.

2. A process according to claim 1 in which the cyclic ether is tetrahydrofuran.

3. A process according to claim 2 wherein one mole of vinylmagnesium chloride and one mole of tin tetrachloride are used to produce vinyltin trichloride.

4. A process according to claim 2 wherein two moles of vinylmagnesium chloride and one mole of tin tetrachloride are used to produce divinyltin dichloride.

5. A process according to claim 2 wherein three moles of vinylmagnesium chloride and one mole of tin tetrachloride are used to produce trivinyltin chloride.

6. A process according to claim 2 wherein four moles of vinylmagnesium chloride and one mole of tin tetrachloride are used to produce tetravinyltin.

7. A process according to claim 1 in which the cyclic ether is 2-methyltetrahydrofuran.

8. A process according to claim 1 in which the cyclic ether is tetrahydrofurfuryl ethyl ether.

9. A process according to claim 1 in which there is also present an inert organic solvent as a diluent for the reaction.

References Cited in the file of this patent
UNITED STATES PATENTS

| | | |
|---|---|---|
| 2,675,397 | Ramsden | Apr. 13, 1954 |
| 2,675,398 | Ramsden et al. | Apr. 13, 1954 |
| 2,675,399 | Ramsden et al. | Apr. 13, 1954 |
| 2,683,705 | Anspon | July 13, 1954 |

OTHER REFERENCES

Kraus: J. A. C. S., 52: 4426–33 (1930).
Koelsch: J. A. C. S., 54: 2045 (1932).